(12) United States Patent
Zhu et al.

(10) Patent No.: US 12,155,578 B2
(45) Date of Patent: Nov. 26, 2024

(54) PACKET FORWARDING METHOD, ELECTRONIC DEVICE, AND STORAGE MEDIUM

(71) Applicant: ZTE CORPORATION, Shenzhen (CN)

(72) Inventors: Xiangyang Zhu, Shenzhen (CN); Jinghai Yu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 18/258,904

(22) PCT Filed: Jan. 29, 2022

(86) PCT No.: PCT/CN2022/074957
§ 371 (c)(1),
(2) Date: Jun. 22, 2023

(87) PCT Pub. No.: WO2022/183879
PCT Pub. Date: Sep. 9, 2022

(65) Prior Publication Data
US 2024/0048502 A1 Feb. 8, 2024

(30) Foreign Application Priority Data
Mar. 3, 2021 (CN) .......................... 202110235437.3

(51) Int. Cl.
*G06F 15/173* (2006.01)
*H04L 47/17* (2022.01)
(Continued)

(52) U.S. Cl.
CPC .......... *H04L 47/6225* (2013.01); *H04L 47/17* (2013.01); *H04L 47/2483* (2013.01)

(58) Field of Classification Search
CPC . H04L 47/17; H04L 47/6225; H04L 47/2483; H04L 47/56; H04L 43/026;
(Continued)

(56) References Cited

U.S. PATENT DOCUMENTS 7,715,418 B2 * 5/2010 Cho .................... H04L 12/4625
370/412
2003/0231590 A1 * 12/2003 Zhao .................... H04L 49/3018
370/230.1
(Continued)

FOREIGN PATENT DOCUMENTS

| CN | 107438029 A | 12/2017 |
|---|---|---|
| CN | 110024339 B | 10/2020 |
| CN | 112202685 A | 1/2021 |

OTHER PUBLICATIONS

3GPP Technical Specification Group System Architecture and Services. "5G Application based uplink traffic identification and QoS mapping," 3GPP SA WG2 Meeting #119, Feb. 2017, pp. 1-3.
(Continued)

*Primary Examiner* — Dustin Nguyen
*Assistant Examiner* — Hao H Nguyen
(74) *Attorney, Agent, or Firm* — Vivacqua Crane, PLLC (57) ABSTRACT

A packet forwarding method, an electronic device, and a storage medium are disclosed. The method may include: determining a flow identifier of the service flow; determining a basic time slot number of a first packet in the service flow according to the flow identifier; determining a time slot offset of the first node for the service flow according to the flow identifier; and determining an enqueue slot number of the first packet according to the basic time slot number and the time slot offset.

13 Claims, 6 Drawing Sheets

(51) Int. Cl.
*H04L 47/2483* (2022.01)
*H04L 47/62* (2022.01)

(58) Field of Classification Search
CPC ..... H04L 47/28; H04L 47/562; H04L 45/121; H04L 47/50; H04L 47/10; H04L 69/22; H04L 2012/5679; H04L 47/621
See application file for complete search history.

(56) References Cited

U.S. PATENT DOCUMENTS

| | | | | |
|---|---|---|---|---|
| 2006/0143300 | A1* | 6/2006 | See | H04L 43/026 709/227 |
| 2008/0037567 | A1* | 2/2008 | Cho | H04L 47/2408 370/401 |
| 2009/0028114 | A1* | 1/2009 | Proctor, Jr. | H04W 72/1263 370/336 |
| 2012/0224481 | A1* | 9/2012 | Babiarz | H04L 47/2408 370/230.1 |
| 2019/0097914 | A1* | 3/2019 | Zhong | H04J 3/1658 |
| 2020/0259755 | A1* | 8/2020 | Wang | H04L 47/283 |
| 2021/0058322 | A1 | 2/2021 | Geng et al. | |
| 2022/0167206 | A1* | 5/2022 | Tilmans | H04L 47/32 |

OTHER PUBLICATIONS

International Searching Authority. International Search Report and Written Opinion for PCT Application No. PCT/CN2022/074957 and English translation, mailed Mar. 21, 2022, pp. 1-10.

European Patent Office. Extended European Search Report for EP Application No. 22762347.7, mailed Mar. 22, 2024, pp. 1-14.

Quan, W., et al. "On-line Traffic Scheduling optimization in IEEE 802.1Qch based Time-Sensitive Networks," IEEE 22nd International Conference on High Performance Computing and Communications, 2020, pp. 369-376.

* cited by examiner

| Field | Service Flow 1 | Service Flow 2 | Service Flow 3 |
|---|---|---|---|
| Flow ID | 1 | 2 | 3 |
| Flow Interval | 150μs | Null | …… |
| Max Packets PerInterval | 3 | Null | …… |
| Slot Interval | 20μs | 40μs | …… |
| Slot Number | 3 | 4 | …… |
| Slot Mapping Strategy | 1 | 2 | …… |
| ΔT | 3 | 2 | …… |

| Field | Service Flow |
|---|---|
| Flow ID | {192.168.1.1,192.168.2.2,1000,2000,10} |
| Flow Interval | 150μs |
| Max Packets PerInterval | 3 |
| Slot Interval | 20μs |
| Slot Number | 5 |
| Slot Mapping Strategy | 1=Based on Sequence Number |
| ΔT | Null |

PACKET FORWARDING METHOD, ELECTRONIC DEVICE, AND STORAGE MEDIUM

CROSS-REFERENCE TO RELATED APPLICATION

This application is a national stage filing under 35 U.S.C. § 371 of international application number PCT/CN2022/074957, filed Jan. 29, 2022, which claims priority to Chinese patent application No. 202110235437.3 filed Mar. 3, 2021. The contents of these applications are incorporated herein by reference in their entirety.

TECHNICAL FIELD

The present disclosure relates to the technical field of communication, in particular to a method for packet forwarding, an electronic device and a storage medium.

BACKGROUND

Cyclic Queuing and Forwarding (CQF) mechanism proposed by IEEE Time Sensitive Networking (TSN) Working Group in the 802.1Qch draft can provide a deterministic forwarding service for TSN services. CQF requires time synchronization between nodes. However, in large-scale three-layer deterministic networks, it is generally challenging to achieve timely synchronization between nodes, so it is not possible to directly reuse CQF technology to provide effective deterministic forwarding services in large-scale networks.

SUMMARY

The following is a summary of the subject matter described herein. This summary is not intended to limit the scope of protection of the claims.

Provided are a method for packet forwarding, an electronic device, and a storage medium in some embodiments of the present disclosure.

According to an embodiment of the present disclosure, there is provided a method for packet forwarding, which is applied to a first node through which a forwarding path of a service flow passes, the method may include, determining a flow identifier of a service flow; determining a basic time slot number of a first packet in the service flow according to the flow identifier; determining a time slot offset of the first node for the service flow according to the flow identifier; and determining an enqueue slot number of the first packet according to the basic time slot number and the time slot offset.

According to an embodiment of the present disclosure, there is provided a first node, which is a node through which a forwarding path of a service flow passes, the node may include, a first determining module, which is configured to determine a flow identifier of the service flow; a second determining module, which is configured to determine a basic time slot number of a first packet in the service flow according to the flow identifier; a third determining module, which is configured to determine a time slot offset of the first node for the service flow according to the flow identifier; and a fourth determining module, which is configured to determine an enqueue slot number of the first packet according to the basic time slot number and the time slot offset.

According to yet another embodiment of the present disclosure, there is provided an electronic device, which may include a memory, a processor, and a computer program stored in the memory and executable on the processor which, when is executed by the processor, causes the processor to carry out the method as described above.

According to yet another aspect of the present disclosure, there is provided a computer-readable medium storing a computer program thereon, which when executed by a processor, causes the processor to carry out the method as described above.

Other features and advantages of the present disclosure will be illustrated in the following description, and in part will be apparent from the description, or may be understood by practicing the present disclosure. The objects and other advantages of the present disclosure can be achieved and obtained by the structure particularly set forth in the description, claims and drawings.

BRIEF DESCRIPTION OF DRAWINGS

The drawings are intended to provide a further understanding of the technical scheme of the present disclosure, and constitute a part of the specification, and they are intended to illustrate the technical scheme of the present disclosure in conjunction with the embodiments of the present disclosure, but are not intended to limit the technical scheme of the present disclosure.

DETAILED DESCRIPTION

The purpose, technical scheme and advantages of the present disclosure will become apparent through the following description for various embodiments in conjunction with the drawings. It should be understood that the embodiments described here are intended for illustration but not limitation to the present disclosure.

It shall be understood that, in the description of an embodiment of the present disclosure, terms "first" and "second" if described, are intended for distinguishing technical features, which shall not be understood as indicating or implying relative importance or implicitly indicating the number of the indicated technical features or the order of the indicated technical features. "At least one" means one or more, and "multiple" means two or more. Connection "and/or" describes the relationship of related objects, indicating that there can be three kinds of relationships. For example, A and/or B, which can indicate the situation that A alone, both A and B, or B alone. A and B can be singular or plural. The character "/" generally indicates that the context object is in "OR" relationship. "At least one of the following" and similar expressions refer to any combination of these items, including any combination of single or plural items. For example, at least one of A, B and C can indicate: A, B, C, both A and B, both A and C, both B and C, or A and B and C, where A, B and C can be single or plural.

In addition, the technical features involved in various embodiments of the present disclosure described below can be combined with each other as long as they do not conflict with each other.

Related technical schemes to some embodiments of the present disclosure are introduced first for a better understanding.

Figure 1:
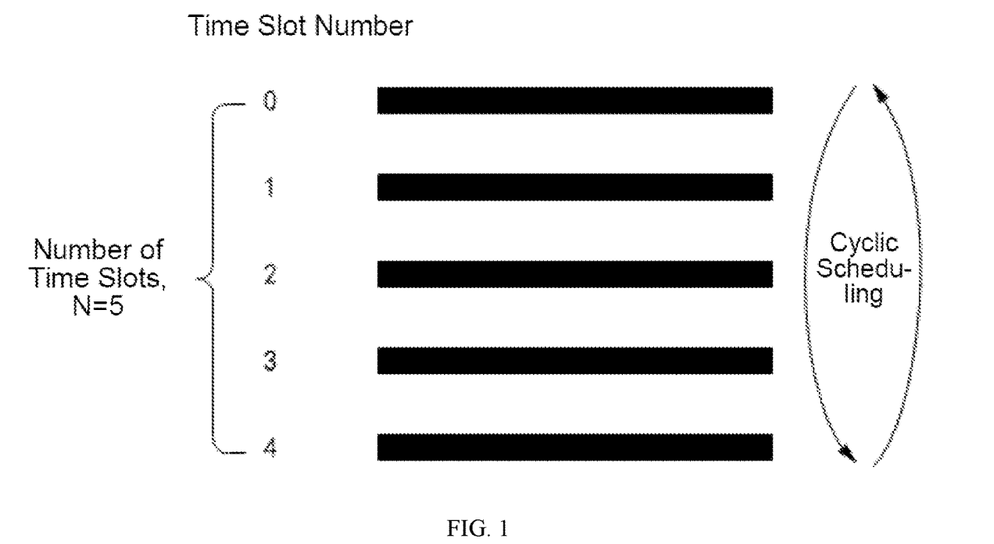
FIG. 1 depicts a schematic diagram showing cyclic scheduling of the CQF mechanism.

Referring to FIG. 1, in the CQF mechanism, each node is provided with a plurality of cache queues for caching packets, and each queue corresponds to a slot number. These cache queues form a cyclic queue, and the queues are forwarded in a cyclic scheduling manner. At a particular time slot, the queue in the sending state sends packets within a specified time slot interval (for example, 10 μs), while the other queues receive packets. In the cyclic queuing and forwarding scheme, the end-to-end delay is related to the number of hops and the time slot interval, while the jitter is only related to the time slot interval and has an upper bound. However, this scheme requires time synchronization between nodes, so it is only suitable for small-scale networks.

There is proposed a forwarding plane solution based on time slot label mapping between upstream and downstream nodes in the related technical scheme. The downstream nodes need to maintain the time slot mapping relationship between the upstream time slot sequence number and the downstream time slot sequence number, and all packets with the same time slot sequence number are sent out in the same outgoing time slot, thus providing deterministic services for bounded delay and jitter. However, this solution requires the carrying of the time slot label information in the packets and the modification of the existing packet encapsulation, which leads to problems in equipment intercommunication and protocol compatibility.

An embodiment of the present disclosure provides a method for packet forwarding method, an electronic device and a storage medium, which can realize deterministic transmission in a large-scale network.

It can be understood that before a user deploys a deterministic service flow, the related information of the service flow is first submitted to the controller through the user network interface. The controller can be a Software Defined Network (SDN) controller, and the related information of the service flow can include but not be limited to application identifier (app ID), service flow identifier (Flow ID), traffic model, network Quality of Service (QoS) requirements, etc. The network parameters read by the controller, include but are not limited to: bandwidth and delay, cyclic queue template maintained by the port, packet header to basic time slot mapping strategy supported by the node. Then the forwarding path for forwarding the service flow is determined according to the requirements of delay and jitter in the QoS of the service flow. The forwarding path passes through a plurality of nodes, such as node A-node B-node C-node D-node E, and the nodes are connected by links. A node described in an embodiment of the present disclosure can be a specific network device, such as a router or a switch.

Figure 2:
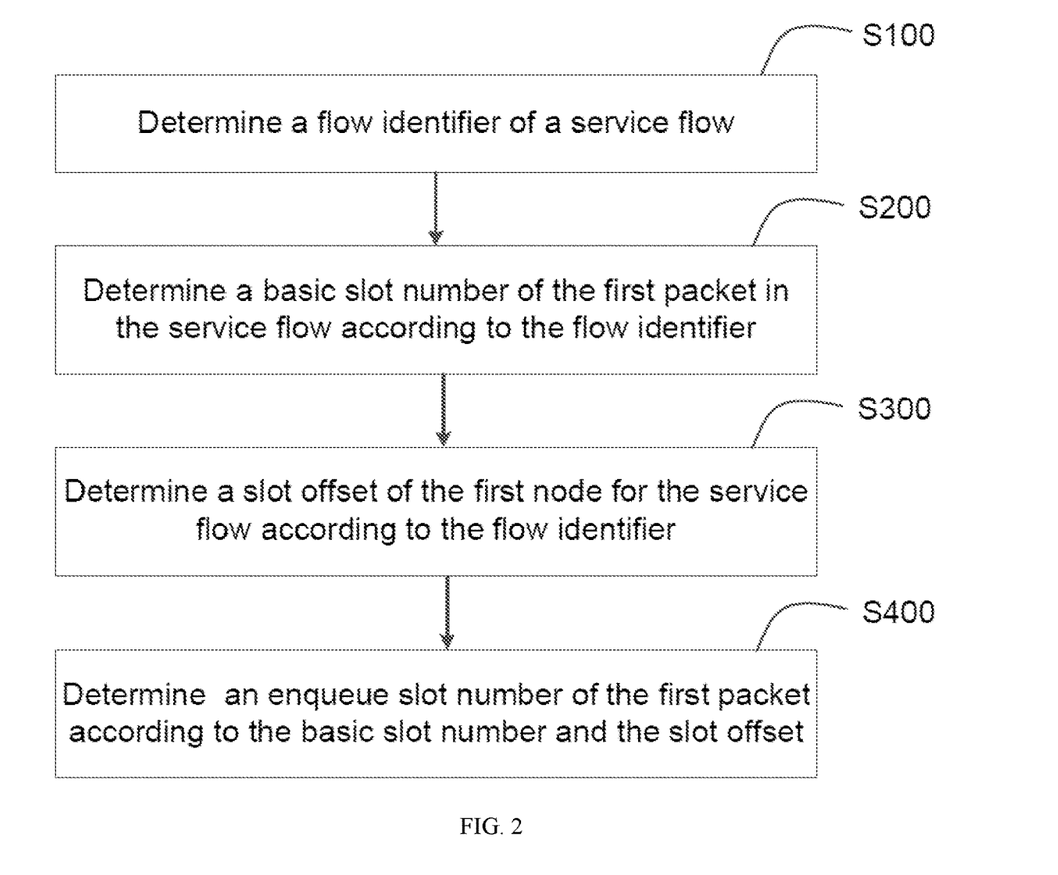
FIG. 2 depicts a flowchart showing a method for packet forwarding according to an embodiment of the present disclosure.

FIG. 2 shows a method for packet forwarding according to an embodiment of the present disclosure. The method for packet forwarding is applied to a first node through which the forwarding path of the service flow passes, where the first node can be any one of the nodes in the forwarding path. As shown in FIG. 2, the method for packet forwarding in an embodiment of the present disclosure includes the following operations.

At S100, a flow identifier of a service flow is determined.

It can be understood that in order not to change the encapsulation of the existing packet to avoid the problems of equipment intercommunication and protocol compatibility, the Flow ID of the service flow in an embodiment of the present disclosure can be formed based on a field or a field combination of the packet header. For example, the Multi-Protocol Label Switching (MPLS) packet of DetNet can utilize s-label and d-cw as the Flow ID, and the IPv4/IPv6 packet of Detnet can utilize fields such as source IP address, destination IP address, source port, destination port, transport layer protocol type, or the priority as the Flow ID.

Figure 3:
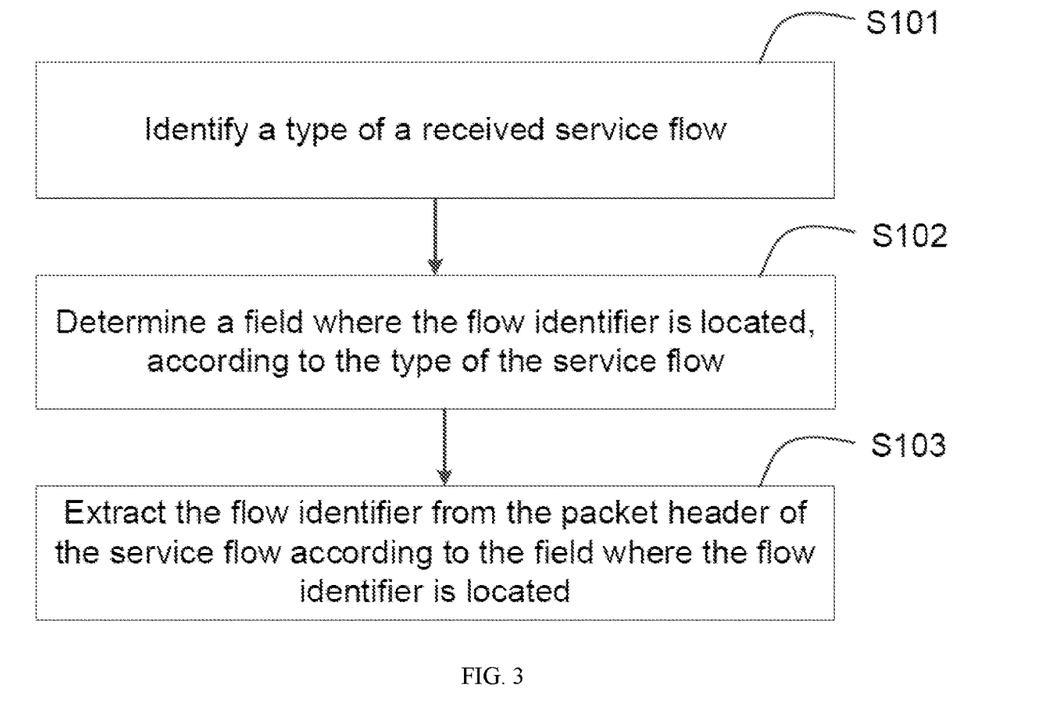
FIG. 3 depicts a flowchart showing sub-operations of S100 in FIG. 2.

Referring to FIG. 3, the determination of the flow identifier of the service flow can include the following operations.

At S101, a type of a received service flow is identified.

As an example, after receiving the service flow, the first node identifies the type of the service flow, which can be the type of MPLS packet, or IPv4/IPv6 packet, etc.

At S102, a field where the flow identifier is located, is determined according to the type of the service flow.

In an implementation, the mapping relationship between the service flow type and the field where the flow identifier is located can be established in advance. In this way, after the type of the currently received service flow is identified, the field where the flow identifier of the currently received service flow is located can be determined according to the mapping relationship. For example, when the type of service flow is identified as MPLS packet, it is determined that the flow where the flow identifier is located is s-label and/or d-cw. When the type of service flow is identified as Pv4/IPv6 packet, it is determined that the field where the flow identifier is located is the combination of one or more fields of, source IP address, destination IP address, source port, destination port, transport layer protocol type and priority.

At S103, the flow identifier is extracted from the packet header of the service flow according to the field where the flow identifier is located.

It can be understood that after the field where the flow identifier is located is determined, the flow identifier is extracted from the field corresponding to the packet header of the service flow.

At S200, a basic time slot number of a first packet in the service flow is determined according to the flow identifier.

As an example, the mapping rules of the flow identifier and the basic time slot number based on the service flow can be established in advance by the controller. After determining the forwarding path of the service flow, the controller sends the mapping rules of the flow identifier and the basic time slot number to each node through which the forwarding path passes. After determining the flow identifier of the current service flow, the first node can determine the basic time slot number mapped to a first packet of the service flow according to the flow identifier. Here, the first packet is any one of one or more packets included in the service flow.

It can be understood that under the condition that the flow identifier presents in the field of the packet header of the service flow, it is indicated that the basic time slot is mapped based on the field of the packet header. In this way, the need for modification of the existing packet encapsulation for carrying the time slot label information in the packet in the related technical scheme is eliminated.

Figure 4:
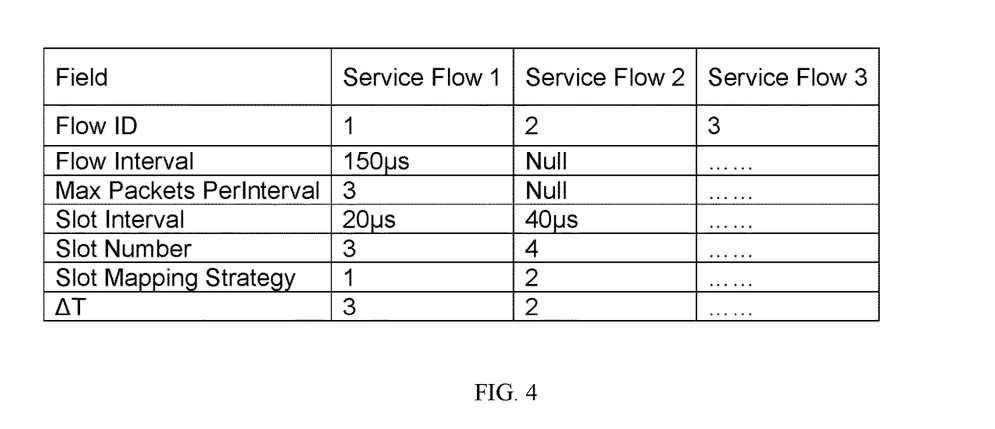
FIG. 4 depicts a schematic diagram showing a list of cyclic scheduling parameters according to an embodiment of the present disclosure.

In an implementation, the controller constructs a list of cyclic scheduling parameters for deterministic service flows. FIG. 4 shows an example of such a list of cyclic scheduling parameters in the form of a table. As shown in FIG. 4, the list of cyclic scheduling parameters includes the following fields.

Flow ID: the key field of the table entry, which is utilized to configure the deterministic service Flow ID. When a node receives packets of a service flow, it is necessary to look up flow ID in the table first to determine whether it is necessary to provide a deterministic forwarding service.

Flow Interval: if the service flow is periodic, the cycle of the service flow is specified in the Flow Interval field; otherwise, the field is "Null";

Max Packets Perinterval: if the service flow is periodic, the maximum number of packets sent in a single cycle is specified in this field, otherwise this field is "Null";

Slot Interval: indicates the time slot interval (duration) of a cyclic queue;

Slot Number: indicates the number of slots in a cyclic queue;

Slot Mapping Strategy: indicates the mapping rule from the field of a packet header to a basic time slot number;

ΔT: time slot offset, which is obtained by self-learning of nodes on the forwarding plane, with the initial value "Null".

It should be noted that the list of the cyclic scheduling parameters shown in FIG. 4 is only illustrative. In an implementation, the list may contain more or fewer fields than those shown in FIG. 4, and this embodiment is not limited thereto.

It can be understood that the controller sends the list of cyclic scheduling parameters for deterministic service flows to each node attributed to the controller, and each node is directed to perform cyclic scheduling with the list of cyclic scheduling parameters. The controller has previously distributed the list of cyclic scheduling parameter to each node, that is, the list of cyclic scheduling parameter has been set in advance in each node where the forwarding path of the service flow passes. Thereby, when deterministic forwarding of a deterministic service flow is performed, each node through which the forwarding path passes is enabled to perform cyclic scheduling for the deterministic service flow according to the unified list of cyclic scheduling parameters.

It can be understood that the upstream and downstream nodes of the forwarding path all utilize the same list of cyclic scheduling parameters, that is, they have the same time slot interval and the number of cache queues, and their frequencies for round-robin processing of the time slots are synchronized.

In some embodiments, when the first node determines the flow identifier of the service flow, the first node also searches for a preset list of cyclic scheduling parameters according to the flow identifier of the service flow. If the list is found, the first node determines the basic time slot number of the first packet in the service flow according to the flow identifier, otherwise, the first node processes the service flow according to the original forwarding process.

For example, when receiving the service flow, the first node first determines the Flow ID of the service flow, e.g., s-label for the MPLS packet for Detnet, or n-tuple of the IPv4/IPv6 packet for Detnet. Then, the first node looks up the Flow ID as the key in the list of cyclic scheduling parameters. If the Flow ID is found in the list, it indicates that it is necessary to provide a deterministic forwarding service for this service flow, otherwise the service flow is handled according to the original forwarding process.

Figure 5:
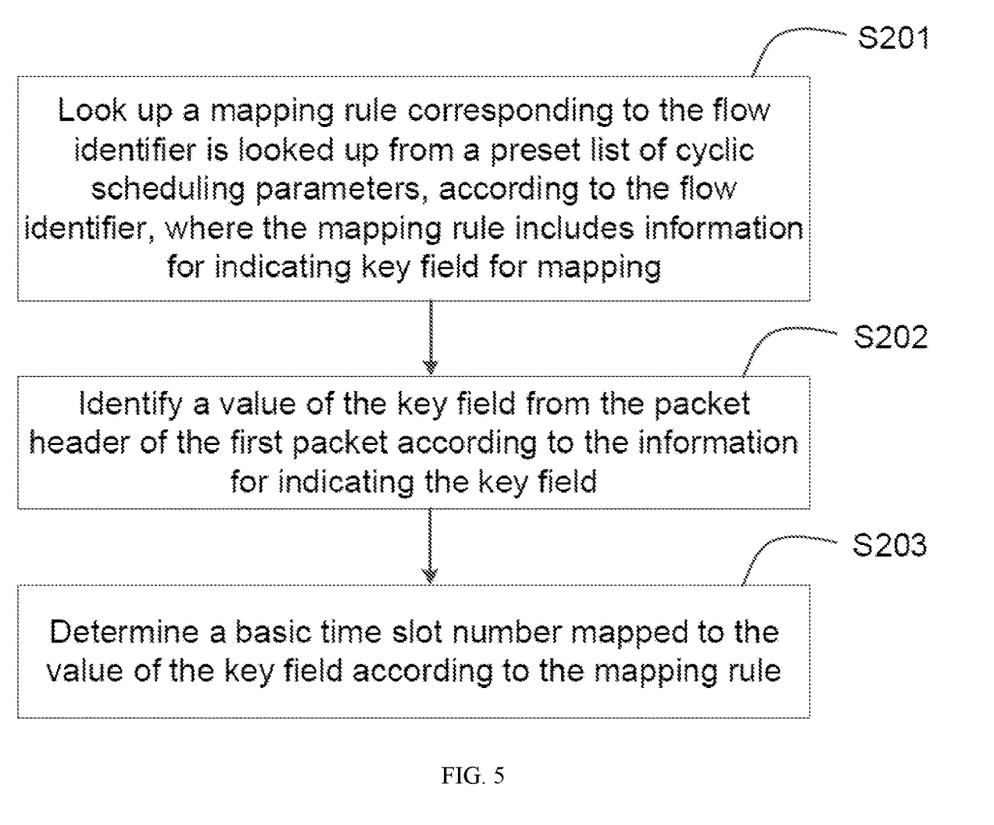
FIG. 5 depicts a flowchart showing sub-operations of S200 in FIG. 2.

Referring to FIG. 5, in an embodiment, the determination of the basic time slot number of the first packet in the service flow according to the flow identifier includes the following operations.

At S201, a mapping rule corresponding to the flow identifier is looked up from a preset list of cyclic scheduling parameters, according to the flow identifier, where the mapping rule includes information for indicating a key field for mapping.

At S202, a value of the key field is identified from the packet header of the first packet according to the information for indicating the key field.

At S203, a basic time slot number mapped to the value of the key field is determined according to the mapping rule.

For example, after determining the Flow ID of the currently received service flow 1, the first node finds the Slot Mapping Strategy corresponding to the Flow ID from the preset list of cyclic scheduling parameters, which indicates that the basic time slot number of the packet shall be determined based on the packet sequence number. Here, the information for indicating the key field contained in the mapping rule corresponding to the Flow ID is the packet sequence number. When the information for indicating the key field is determined to be the packet sequence number, the packet sequence number is extracted from the packet header of the first packet, and then the basic time slot number mapped to the packet sequence number is determined according to the mapping rule.

At S300, a time slot offset of the first node for the service flow is determined according to the flow identifier.

Figure 6A:
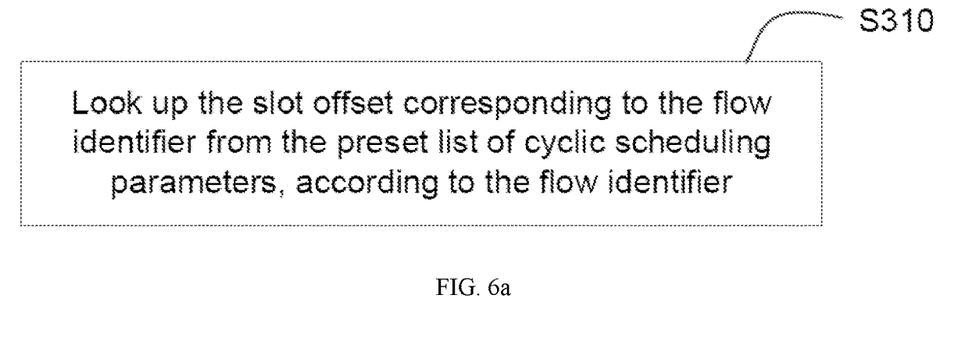
FIG. 6a depicts a flowchart showing sub-operations of S300 in FIG. 2.

Referring to FIG. 6*a*, in some embodiments, the determination of the time slot offset of the first node for the service flow according to the flow identifier includes the following operation.

At S310, the time slot offset corresponding to the flow identifier is looked up from the preset list of cyclic scheduling parameters, according to the flow identifier.

It can be understood that after determining the Flow ID of the currently received service flow, the first node can look up the ΔT corresponding to the current Flow ID from the preset list of cyclic scheduling parameters. And if the ΔT field is not "Null", the time slot offset corresponding to the flow ID can be determined.

It can be understood that if the ΔT field corresponding to the current Flow ID in the preset list of cyclic scheduling parameters is "Null", the first node needs to self-learn its own time slot offset with respect to the current service flow.

Figure 6B:
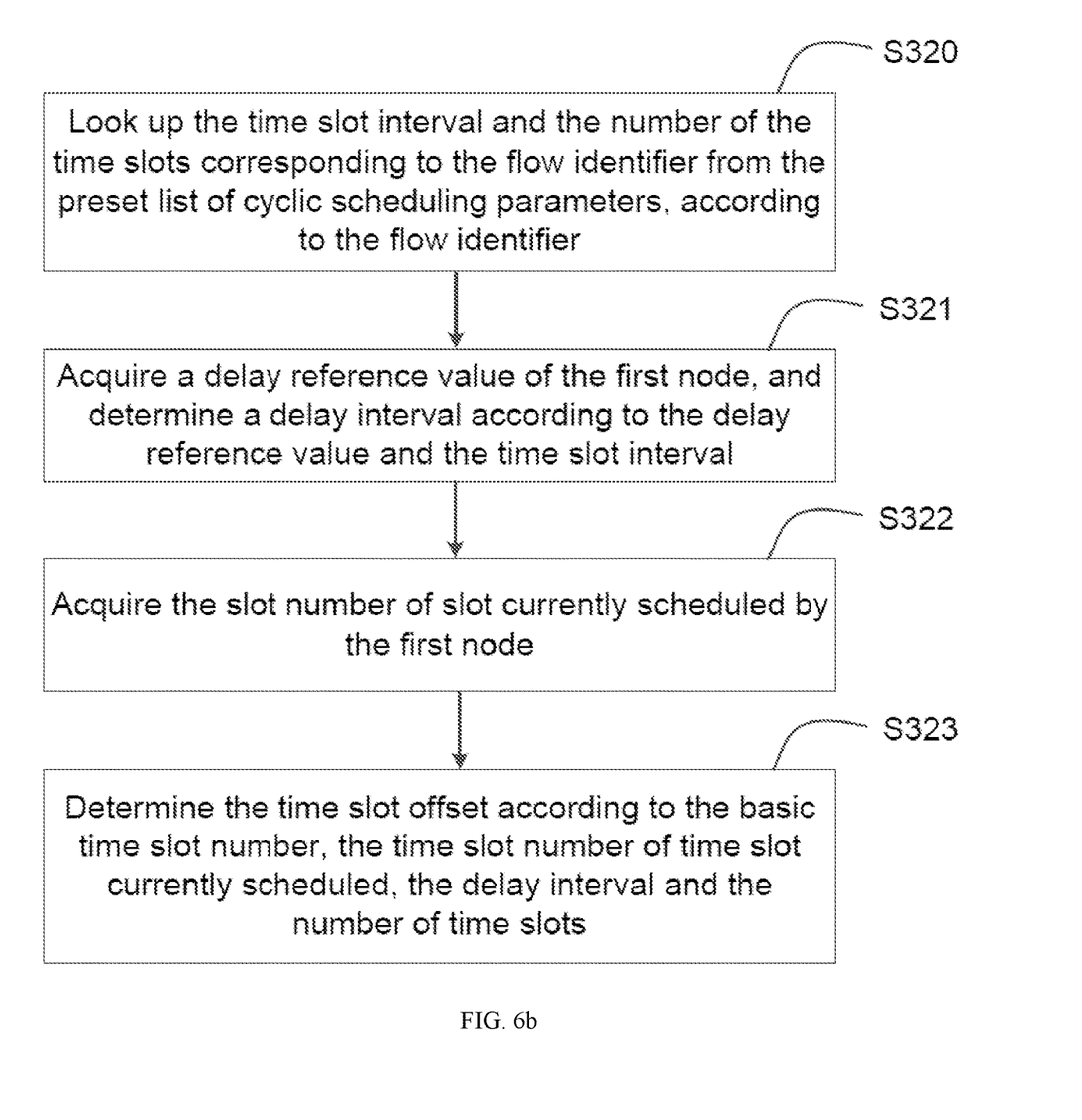
FIG. 6b depicts a flowchart showing sub-operations of S300 in FIG. 2.

Referring to FIG. 6*b*, in some embodiments, the determination of the time slot offset of the first node for the service flow according to the flow identifier includes the following operation.

At S320, the time slot interval and the number of the time slots corresponding to the flow identifier are looked up from the preset list of cyclic scheduling parameters, according to the flow identifier.

For example, with reference to FIG. 4, the Slot Interval field and Slot Number field corresponding to the current Flow ID can be found from the list of cyclic scheduling parameters, such that the time slot interval and the number of the time slots corresponding to the flow identifier can be obtained.

At S321, a delay reference value of the first node is acquired, and a delay interval is determined according to the delay reference value and the time slot interval.

In an implementation, the delay reference value can be determined by the maximum forwarding delay value between the ingress port and the egress port of the first node. Assuming that the delay reference value is maxdelay, the delay interval Δt can be determined by the following equation (1) according to the delay reference value maxdelay and the time slot interval t indicated in the list of cyclic scheduling parameters:

$$\Delta t = \text{maxdelay}/t \quad (1)$$

At S322, the slot number of slot currently scheduled by the first node is acquired.

For example, the slot number corresponding to the queue currently in the transmitting state in the first node is 3, that is, the slot currently scheduled by the first node is slot number 3.

At S323, the time slot offset is determined according to the basic time slot number, the time slot number of time slot currently scheduled, the delay interval and the number of time slots.

In an example, after determining the basic time slot number of the current first packet, the time slot number of the time slot currently scheduled by the first node, the delay interval and the number of time slots, the time slot offset of the current first packet can be determined by the following equation:

$$\Delta T = (T2 + \Delta t - T1 + N) \% N \quad (2)$$

where ΔT denotes the time slot offset, T1 denotes the basic time slot number, T2 denotes the time slot number of the time slot currently being scheduled, Δt denotes the delay interval, and N denotes the number of time slots.

It should be noted that the calculation of the time slot offset by equation (2) set forth in an embodiment of the present disclosure is illustrative merely, and other equations derived from a modification of equation (2) can also be used to calculate the time slot offset, and this embodiment is not limited thereto.

It can be understood that the first node can realize self-learning for the time slot offset of the current service flow through the above operations S320 to S323.

It can be understood that the first node, after determining the time slot offset for the service flow, further stores the time slot offset in the preset list of cyclic scheduling parameters for further utilization by subsequent packets.

At S400, an enqueue slot number of the first packet is determined according to the basic time slot number and the time slot offset.

It can be understood that after the time slot offset is determined, the basic time slot number is shifted according to the time slot offset, and the enqueue slot number of the first packet can be determined. The enqueue slot number thus obtained can prevent the first node from scheduling delay, thus ensuring the queuing delay of the packets at the first node.

It can be understood that, when the round-robin scheduling is executed to the first packet with the enqueue slot number, the sending of the first packet to a next hop node would thus complete the forward of the first packet at the current first node.

The method for packet forwarding in some embodiments of the present disclosure will be illustrated below through some examples.

Example Embodiment One

Figure 7A:
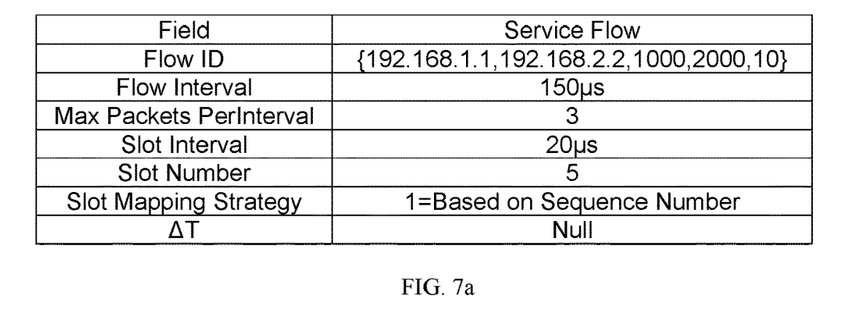
FIG. 7a depicts a schematic diagram showing a list of cyclic scheduling parameters in Example Embodiment One of the present disclosure.

Assuming that the maximum processing delay maxDelay of node A is 40 us, and the list of cyclic scheduling parameters configured by node A is as shown in FIG. 7a, which contains the cyclic scheduling parameters of a service flow.

And assuming that node A receives two IPv4 service flows, the quintuple of service flow 1 is {192.168.2.1, 192.168.3.1, 500, 1000, 10}, and the quintuple of service flow 2 is {192.168.1.1,192.168.2.2,1000,2000,10}.

Regarding the packets of service flow 1, node A extracts the quintuple from the packets and looks up the quintuple in the list of cyclic scheduling parameters. It can be expected that the looking-up would fail, so the packets will be processed according to the original method. For example, the packets will be transferred to a queue of an egress port based on their priorities.

Regarding the packet of service flow 2, node A extracts the quintuple from the packet and looks up the quintuple in the list of cyclic scheduling parameters. It can be expected that the looking-up would succeed, and in that case it is indicated that the packets of service flow 2 shall be processed according to the scheme in an embodiment of the present disclosure. According to the Slot Mapping Strategy field in the table entry, the basic time slot mapping is calculated based on the sequence number of the packet (Sequence Number), and the slot mapping calculation equation is supposed to be:

$$T1 = \frac{cycle1 * sequenceNumber}{t * MaxPacketsPerInterval} \% N$$

where T1 denotes the basic time slot number, cycle1 represents the service period, and t represents the time slot interval.

Figure 7B:
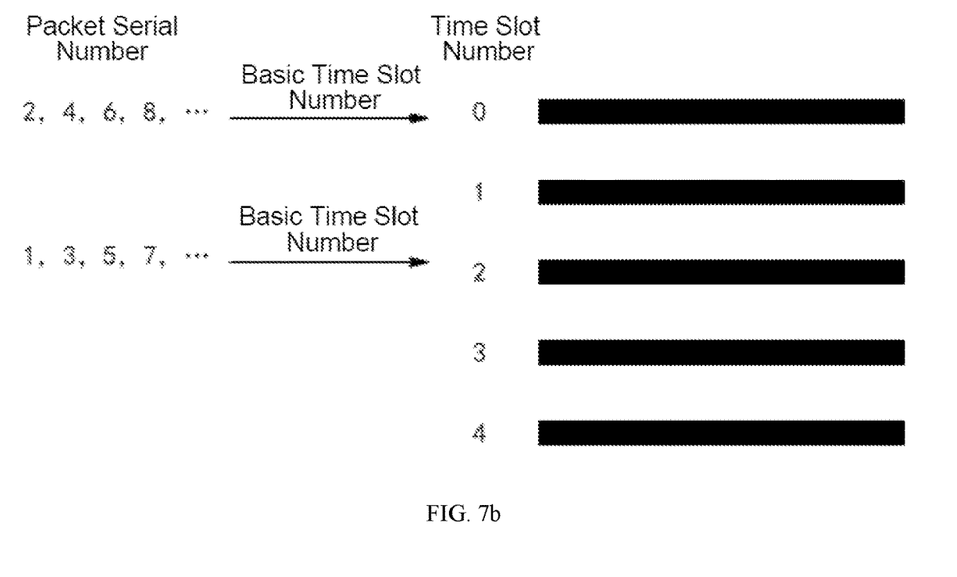
FIG. 7b depicts a schematic diagram showing the basic time slot number corresponding to each packet in Example Embodiment One of the present disclosure.

With reference to FIG. 7b, the calculation result of the basic time slot number of each packet in this example embodiment is as follows:

For Sequence Number=1, the basic time slot number is $T1_1=(1*150/20/3) \% 5=2$.

For Sequence Number=2, the basic time slot number is $T1_2=(2*150/20/3) \% 5=0$.

For Sequence Number=3, the basic time slot number is $T1_3=(3*150/20/3) \% 5=2$.

For Sequence Number=4, the basic time slot number is $T1_4=(4*150/20/3) \% 5=0$.

For Sequence Number=5, the basic time slot number is $T1_5=(5*150/20/3) \% 5=2$.

According to the above calculation results, the basic time slot number of the packet with Sequence Number=1 is 2. Then the value of the ΔT field in the table entry is found to be "Null", so ΔT would be calculated according to the self-learning method by the node itself. The time slot number of the time slot currently being scheduled is found to be 3. Then it can be calculated that ΔT=(3+2−2+5) % 5=3 according to equation (2) described above. The node stores the calculated value of ΔT into the table entry of the list of cyclic scheduling parameters corresponding to the service flow.

Figure 7C:
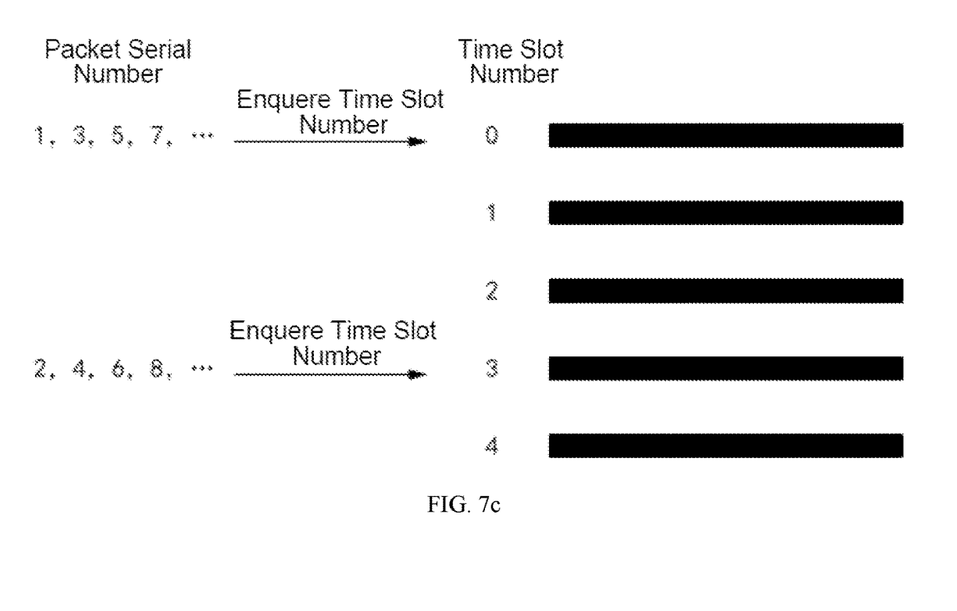
FIG. 7c depicts a schematic diagram showing the basic time slot number when enqueueing corresponding to each packet in Example Embodiment One of the present disclosure.

Then, for the packet with Sequence Number=1, it can be readily to calculate its enqueue slot number as: $cycle_{in\_1}=(T1_1+\Delta T)\%N=(2+3)\%5=0$, and the node buffers the packet with Sequence Number=1 into the queue with slot number 0 according to the calculation result. When round-robin scheduling proceeds to the queue with time slot number 0, the first packet of the service flow is scheduled and sent out.

For the received second packet of service flow 2 (Sequence Number=2), the mapping calculation method of basic time slot number is the same as that of the first packet. According to the above calculation results, the basic time slot number is 0. When the value of the ΔT field is found to be ΔT=3 in the table entry, the time slot is directly shifted to get the enqueue slot number $cycle_{in\_2}=(T1_2+\Delta T)\%N=(0+3)\%5=3$ of the second packet.

For the received third packet of service flow 2 (Sequence Number=3), the mapping calculation method of basic time slot number is the same as that of the first packet. According to the above calculation results, the basic time slot number is 2. When the value of the ΔT field is found to be ΔT=3 in the table entry, the time slot is directly shifted to get the enqueue slot number $cycle_{in\_3}=(T1_3+\Delta T)\%N=(2+3)\%5=0$ of the third packet.

For the fourth, fifth, sixth, . . . Packet of service flow 2 received subsequently, the basic time slot number mapping and time slot offset calculation methods of enqueue time slot numbers are the same as those of the second and third packets mentioned above, and which will not be repeated here. The enqueue slot number of each packet finally obtained is shown in FIG. 7c.

Example Embodiment Two

This embodiment illustrates the strategy of calculating the basic time slot mapping with a hash algorithm based on the Flow ID of the packet header, i.e., the basic time slot number T1=hash(FlowID) % N, which means that the hash calculation is performed based on the Flow ID first, and then the basic time slot number is obtained by modulo operation to the number of cyclic queues.

Assuming there are five DetNet MPLS service flows, the Flow IDs of which are s-label=1, 2, 3, 4 and 5 respectively, and the number of time slots in the list of cyclic scheduling parameters is N=5.

Assuming that the corresponding field of the list of cyclic scheduling parameters indicates that the basic time slot mapping is carried out based on the Flow ID of the packet header of the service flow by the hash algorithm, and the hash calculation result of the Flow ID of each DetNet MPLS service flow is as follows.

For the first service flow, hash(1)=150;
For the second service flow, hash (2)=12;
For the third service flow, hash (3)=34;
For the fourth service flow, hash (4)=14;
For the fifth service flow, hash(5)=53.

It can be readily to calculate the basic time slot mapping of packets in each service flow according to T1=hash(FlowID) % N, and the calculation results are as follows:

For Flow ID=1, the basic time slot number is 150% 5=0;
For Flow ID=2, the basic time slot number is 12% 5=2;
For Flow ID=3, the basic time slot number is 34% 5=4;
For Flow ID=4, the basic time slot number is 14% 5=4;
For Flow ID=5, the basic time slot number is 53% 5=4.

It should be noted that the corresponding basic time slot number calculation strategy can be flexibly adopted according to the practical application scenario requirements, and the example of value selection in this embodiment is illustrative merely, and is not a limitation to the embodiment of the present disclosure.

Example Embodiment Three

This example embodiment further illustrates the calculation of time slot offset ΔT.

Suppose the equation for calculation of ΔT is: $\Delta T=(T2+\Delta t-T1+N)\%N$;
where ΔT denotes the time slot offset, T1 denotes the basic time slot number, T2 denotes the time slot number of the time slot currently being scheduled, Δt denotes the delay interval, and N denotes the number of time slots.

Here, since the value of (T2+Δt−T1) may be negative, it is necessary to add N before modulo operation to the number of time slots N.

Assuming the maximum processing delay maxDelay of the node is 20 us, based on the slot calculation strategy, the basic time slot number T1 of the first packet is calculated to be 4. The slot number currently in the scheduling state when the node receives the first packet is 0, the number of time slots in the list of cyclic scheduling parameters is N=5, and the time slot interval is t=10 us. Time slot offset of the service flow is calculated as follows:

$$\Delta T=(T2+\Delta t-T1+N)\%N=(0+20/10-4+5)\%5=3;$$

Then for the first packet of this service, after offset adjustment ΔT=3, the enqueue time slot of this packet is:

$$cycle_{in}=(T1+\Delta T)\%N=(4+3)\%5=2;$$

Assuming that another packet of this service is subsequently received, and the basic time slot number T1 obtained according to the time slot mapping calculation strategy is 3, after adjusting the time slot offset ΔT=3, the enqueue time slot of this packet is:

$$cycle_{in}=(T1+\Delta T)\%N=(3+3)\%5=1.$$

According to the scheme of an embodiment of the present disclosure, after receiving the service flow, the first node determines the basic time slot number and time slot offset corresponding to the first packet of the service flow according to the flow identifier of the service flow, and then determines the enqueue slot number of the first packet according to the basic time slot number and the time slot offset, and provides deterministic forwarding service with bounded delay and jitter for the packets through the forwarding plane. This scheme does not need time synchronization between nodes along the forwarding path, so it is especially suitable for large-scale network applications. By means of the method for packet forwarding according to various embodiments of the present disclosure, the intermediate nodes will not introduce additional jitter, and the maximum end-to-end jitter of the service is 2*t, where t is the time slot interval of the list in the cyclic scheduling parameters.

Figure 8:
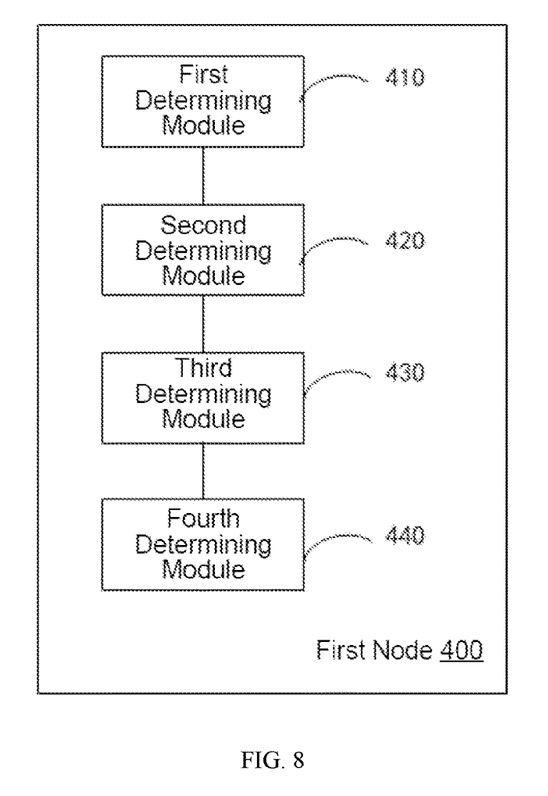
FIG. 8 depicts a schematic diagram showing a first node according to an embodiment of the present disclosure.

Referring to FIG. 8, an embodiment of the present disclosure further provides a first node 400, which is a node through which a forwarding path of a service flow passes. The first node includes the following.

A first determining module 410, which is configured to determine a flow identifier of a service flow.

A second determining module 420, which is configured to determine a basic time slot number of the first packet in the service flow according to the flow identifier.

A third determining module 430, which is configured to determine the time slot offset of the first node for the service flow according to the flow identifier.

A fourth determining module 440, which is configured to determine the enqueue slot number of the first packet according to the basic time slot number and the time slot offset.

In an embodiment, the first determining module 410 includes the following.

An identification unit, which is configured to identify the type of the received service flow.

A first determining unit, which is configured to determine the field where the flow identifier is located according to the type of the service flow.

An extraction unit, which is configured to extract the flow identifier from the packet header of the service flow according to the field where the flow identifier is located.

In an example, the second determining module 420 includes the following.

A first searching unit, which is configured to, look up a mapping rule corresponding to the flow identifier from a preset list of cyclic scheduling parameters, according to the flow identifier, where the mapping rule includes the information for indicating the key field for mapping.

A second determining unit, which is configured to determine the value of the key field from the packet header of the first packet according to the information for indicating the key field.

A third determining unit, which is configured to determine a basic time slot number mapped to the value of the key field according to the mapping rule.

In an example, the third determining module 430 includes the following.

A second searching unit, which is configured to look up the time slot interval and the number of the time slots corresponding to the flow identifier from the preset list of cyclic scheduling parameters, according to the flow identifier.

A fourth determining unit, which is configured to obtain a delay reference value of the first node and determine a delay interval according to the delay reference value and the time slot interval.

An acquisition unit, which is configured to acquire a slot number of a currently scheduled slot by the first node.

A fifth determining unit is configured to determine the time slot offset according to the basic time slot number, the slot number of the currently scheduled slot, the delay interval and the quantity of time slots.

In an implementation, the second searching unit is further configured to look up the time slot offset corresponding to the flow identifier from the preset list of cyclic scheduling parameters, according to the flow identifier.

In an implementation, the third determining module 430 further includes the following.

A recording unit, which is configured to record the time slot offset in the preset list of cyclic scheduling parameters.

In an implementation, the first node 400 of an embodiment of the present disclosure further includes the following.

A scheduling module, which is configured to send the first packet to a next hop node, in response to the round robin scheduling is being executed to the first packet with the enqueue slot number.

In an implementation, the list of cyclic scheduling parameters is preset in each node through which the forwarding path of the service flow passes, and the list of cyclic scheduling parameters is utilized to direct each node to perform cyclic round-robin scheduling.

It should be noted that the information interaction, execution process and other contents between the above modules are based on the same concept as the method embodiment of the present disclosure, and their specific functions and technical effects can be seen in the method embodiment section for details, which will not be repeated here.

In the above-described embodiments, the description of each embodiment focuses on a respective aspect. Those portions that are not detailed or recited in one embodiment, can be referred to the relevant descriptions of other embodiments.

Figure 9:
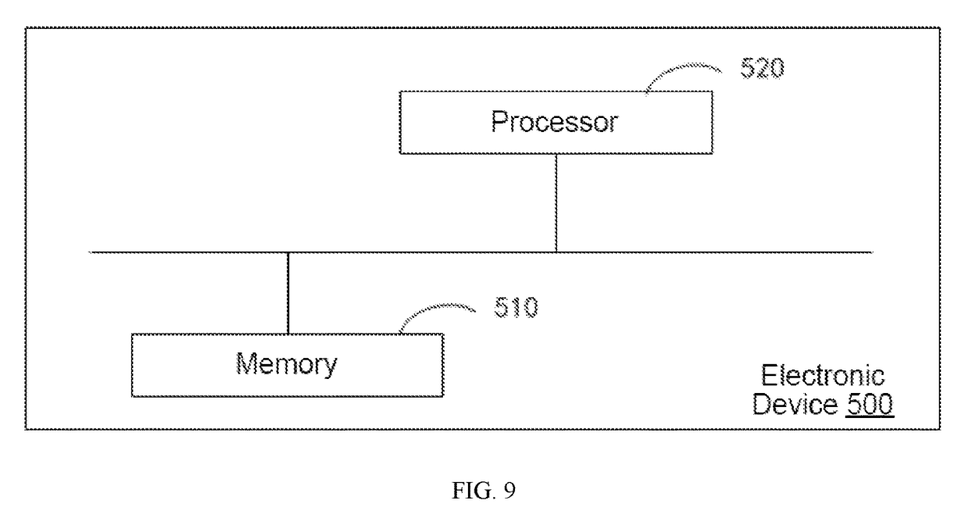
FIG. 9 depicts a schematic diagram showing an electronic device according to an embodiment of the present disclosure.

Referring to FIG. 9, which shows an electronic device 500 according to an embodiment of the present application, the device includes a memory 510, a processor 520 and a computer program stored in the memory 510 and executable by the processor 520.

The processor 520 and the memory 510 may be connected by a bus or other means.

As a non-transitory computer-readable storage medium, the memory 510 can be configured to store non-transitory software programs and non-transitory computer-executable programs. In addition, the memory 510 can include high-speed random-access memory and non-transitory memory, such as at least one disk memory device, flash memory device, or other non-transitory solid-state memory devices. In some implementations, the memory may include memories remotely located relative to the processor 520, and these remote memories may be connected to the processor 520 through a network. Examples of the above networks include, but are not limited to, the Internet, intranet, local area network, mobile communication network, and combinations thereof.

Non-transitory software programs and instructions for the method in the above embodiments are stored in memory 510 which, when executed by processor 520, causes the processor to carry out the method for packet forwarding in any one of the embodiments described above.

The above-described embodiments are only schematic, in which the units illustrated as separate components may or may not be physically separated, that is, the device may be located in one place or distributed over several network units. Some or all of the modules can be selected according to the practical needs to achieve the purpose of this embodiment.

An embodiment of the present disclosure further provides a computer-readable storage medium, which stores a computer program, which is executable by a processor or controller which, when executed by the processor or controller, causes the processor or controller to carry out the method for packet forwarding in any one the above embodiments.

According to the scheme of an embodiment of the present disclosure, a first node through which a forwarding path of a service flow passes determines a flow identifier of the service flow; the first node determines the basic time slot number of the first packet in the service flow according to the flow identifier; the first node determines the time slot offset of the first node for the service flow according to the flow identifier; the first node determines the enqueue slot number of the first packet according to the basic time slot number and the time slot offset. In this way, after receiving the service flow, the first node determines the basic time slot number and time slot offset corresponding to the first packet of the service flow according to the flow identifier of the service flow, and then determines the enqueue slot number of the first packet according to the basic time slot number and the time slot offset, and provides deterministic forwarding service with bounded delay and jitter for the packets through the forwarding plane. This scheme does not need time synchronization between nodes along the forwarding path, so it is especially suitable for large-scale network applications.

It shall be appreciated by a person having ordinary skills in the art that all or some of the steps and systems disclosed above can be implemented as software, firmware, hardware and their appropriate combinations. Some or all physical components can be implemented as software executed by a processor, such as a central processing unit, a digital signal processor or a microprocessor, or as hardware, or as an integrated circuit, such as an application-specific integrated circuit. Such software can be distributed on computer-readable media, which can include computer storage media (or non-transitory media) and communication media (or transitory media). As is well known to a person having ordinary skills in the art, the term computer storage medium includes volatile and nonvolatile, removable and non-removable medium implemented in any method or technology for storing information such as computer-readable instructions, data structures, program modules or other data. Computer storage medium includes, but is not limited to, RAM, ROM, EEPROM, flash memory or other memory technologies, CD-ROM, digital versatile disks (DVD) or other optical disk storage, magnetic boxes, tapes, magnetic disk storage or other magnetic storage devices, or any other medium that can be used to store desired information and accessible by a computer. Furthermore, it is well known to those having ordinary skills in the art that communication media usually contains computer-readable instructions, data structures, program modules or other data in modulated data signals such as carrier waves or other transmission mechanisms, and can include any information delivery media.

Described above is a description for some embodiments of the present disclosure, but the present disclosure is not limited to the above embodiments. Those having ordinary skills in the art can make various equivalent modifications or substitutions without departing the scope of the present disclosure, and these equivalent modifications or substitutions are within the scope defined by the claims of the present disclosure.

What is claimed is:

1. A method for packet forwarding, which is applied to a first node through which a forwarding path of a service flow passes, the method comprising,
    determining a flow identifier of the service flow;
    determining a basic time slot number of a first packet in the service flow according to the flow identifier;
    determining a time slot offset of the first node for the service flow according to the flow identifier; and
    determining an enqueue slot number of the first packet according to the basic time slot number and the time slot offset;
    wherein determining the time slot offset of the first node for the service flow according to the flow identifier comprises,
    looking up a time slot interval and a quantity of time slots corresponding to the flow identifier from the preset list of cyclic scheduling parameters, according to the flow identifier;
    acquiring a delay reference value of the first node, and determining a delay interval according to the delay reference value and the time slot interval;
    acquiring a slot number of a currently scheduled slot by the first node; and
    determining the time slot offset according to the basic time slot number, the slot number of the currently scheduled slot, the delay interval and the quantity of time slots.

2. The method according to claim 1, wherein determining the basic time slot number of the first packet in the service flow according to the flow identifier comprises,
    looking up a mapping rule corresponding to the flow identifier from a preset list of cyclic scheduling parameters according to the flow identifier, wherein the mapping rule comprises information for indicating a key field for mapping;
    determining a value of the key field from the packet header of the first packet according to the information for indicating the key field; and
    determining the basic time slot number mapped to the value of the key field according to the mapping rule.

3. The method according to claim 1, wherein determining the time slot offset of the first node for the service flow according to the flow identifier comprises,
    looking up the time slot offset corresponding to the flow identifier from the preset list of cyclic scheduling parameters, according to the flow identifier.

4. The method according to claim 1, wherein after determining the time slot offset according to the basic time slot number, the slot number of the currently scheduled slot, the delay interval and the quantity of time slots, the method further comprises,
    recording the time slot offset in the preset list of cyclic scheduling parameters.

5. The method according to claim 2, wherein the list of cyclic scheduling parameters is preset in each node through which the forwarding path of the service flow passes, and the list of cyclic scheduling parameters is utilized to direct each node to perform cyclic round-robin scheduling.

6. The method according to claim 1, further comprising,
    sending the first packet to a next hop node, in response to the round-robin scheduling proceeding to the first packet with the enqueue slot number.

7. The method according to claim 1, wherein determining the flow identifier of the service flow comprises,
    identifying a type of the service flow received;
    determining a field where the flow identifier is located, according to the type of the service flow; and
    extracting the flow identifier from a packet header of the service flow according to the field where the flow identifier is located.

8. A first node, which is a node through which a forwarding path of a service flow passes, the node comprising,
    a processor;
    a first determining module, which is configured to determine a flow identifier of the service flow;
    a second determining module, which is configured to determine a basic time slot number of a first packet in the service flow according to the flow identifier;
    a third determining module, which is configured to determine a time slot offset of the first node for the service flow according to the flow identifier; and
    a fourth determining module, which is configured to determine an enqueue slot number of the first packet according to the basic time slot number and the slot offset;

wherein determining the time slot offset of the first node for the service flow according to the flow identifier comprises, looking up a time slot interval and a quantity of time slots corresponding to the flow identifier from the preset list of cyclic scheduling parameters, according to the flow identifier;

acquiring a delay reference value of the first node, and determining a delay interval according to the delay reference value and the time slot interval;

acquiring a slot number of a currently scheduled slot by the first node; and determining the time slot offset according to the basic time slot number, the slot number of the currently scheduled slot, the delay interval and the quantity of time slots.

9. An electronic device, comprising a memory, a processor and a computer program stored in the memory and executable by the processor which, when executed by the processor causes the processor to carry out the method of claim 1.

10. A computer readable storage medium storing a computer program, which when executed by a processor, causes the processor to carry out the method of claim 1.

11. The method according to claim 3, wherein the list of cyclic scheduling parameters is preset in each node through which the forwarding path of the service flow passes, and the list of cyclic scheduling parameters is utilized to directed direct each node to perform cyclic round-robin scheduling.

12. The method according to claim 1, wherein the list of cyclic scheduling parameters is preset in each node through which the forwarding path of the service flow passes, and the list of cyclic scheduling parameters is utilized to directed direct each node to perform cyclic round-robin scheduling.

13. The method according to claim 4, wherein the list of cyclic scheduling parameters is preset in each node through which the forwarding path of the service flow passes, and the list of cyclic scheduling parameters is utilized to directed direct each node to perform cyclic round-robin scheduling.

* * * * *